US009321137B1

(12) United States Patent
Snavely et al.

(10) Patent No.: US 9,321,137 B1
(45) Date of Patent: Apr. 26, 2016

(54) TOOL AND METHOD FOR SEATING ENGINE PISTONS (71) Applicant: Norfolk Southern Corporation, Norfolk, VA (US)

(72) Inventors: James R Snavely, Fincastle, VA (US); Aaron L Lafon, Blacksburg, VA (US)

(73) Assignee: NORFOLK SOUTHERN CORPORATION, Norfolk, VA (US)

( * ) Notice: Subject to any disclaimer, the term of this patent is extended or adjusted under 35 U.S.C. 154(b) by 368 days.

(21) Appl. No.: 13/936,697

(22) Filed: Jul. 8, 2013

(51) Int. Cl.
*B21J 7/00* (2006.01)
*B23P 19/04* (2006.01)
*B25B 27/14* (2006.01)
*B21J 11/00* (2006.01)
*B23P 11/02* (2006.01)
*B21J 9/00* (2006.01)

(52) U.S. Cl.
CPC ............... *B23P 19/042* (2013.01); *B25B 27/14* (2013.01); *B21J 7/00* (2013.01); *B21J 9/00* (2013.01); *B21J 11/00* (2013.01); *B23P 11/027* (2013.01); *B23P 19/04* (2013.01)

(58) Field of Classification Search
CPC ........ B23P 19/04; B23P 11/027; B21J 11/00; B21J 9/00; B21J 7/00
USPC ......... 29/464, 428, 219, 222, 888.04, 888.06, 29/244–282, 267; 269/3, 4, 6
See application file for complete search history.

(56) References Cited

U.S. PATENT DOCUMENTS

| | | |
|---|---|---|
| 90,559 A | 6/1869 | Puller |
| 788,398 A | 4/1905 | Fladby |
| 852,145 A | 4/1907 | Stevens |
| 1,091,301 A | 3/1914 | Doheny |
| 1,110,210 A | 9/1914 | Kissinger |
| 1,202,308 A | 10/1916 | Perry |
| 1,204,028 A | 11/1916 | Johnson |
| 1,265,745 A | 5/1918 | Carpenter |
| 1,346,416 A | 7/1920 | Newton |
| 1,370,397 A * | 3/1921 | Axelton ................. B25B 27/26 29/220 |
| 1,374,694 A * | 4/1921 | Webster ................. B25B 27/26 29/219 |
| 1,444,280 A | 1/1922 | Slough |
| 1,529,476 A | 7/1922 | Frame |
| 1,466,796 A * | 9/1923 | Kibbe .................... B25B 27/26 29/219 |
| 1,630,942 A | 8/1926 | Hughes |
| 2,341,403 A | 6/1943 | Clark |

(Continued)

OTHER PUBLICATIONS

"Water Pump—for Small Hands—working machine model for children ages 3-8," www.smallhands.com/water-pump.

*Primary Examiner* — Monica Carter
*Assistant Examiner* — Mahdi H Nejad
(74) *Attorney, Agent, or Firm* — Goodwin Procter LLP (57) ABSTRACT

Designs of a tool for seating engine pistons and related methods are disclosed. For example, a tool may comprise a mount element, coupled to a support element, with at least one sleeve shaped to slide onto one or more studs on an EMD engine block. The tool may also comprise a locator element, coupled to the mount element, having a guiding ring positioned relative to the at least one sleeve. The tool may further comprise a cantilever beam pivotally coupled to the support element. The tool may additionally comprise a push rod inserted through the guiding ring and coupled to the cantilever beam, such that a pivoting motion of the cantilever beam causes a linear movement of the push rod through the guiding ring. An attachment element, located on one end of the push rod, may be adapted to attach to a piston of the EMD engine.

10 Claims, 8 Drawing Sheets

(56) References Cited

U.S. PATENT DOCUMENTS

| | | | |
|---|---|---|---|
| 2,627,653 A * | 2/1953 | Wisner | B25B 27/26 29/220 |
| 2,940,166 A | 6/1954 | Moore | |
| 2,746,323 A | 5/1956 | Johnson | |
| 3,120,701 A * | 2/1964 | Wilson | B25B 27/02 254/116 |
| 3,789,496 A | 2/1974 | Barabas | |
| 3,798,738 A | 3/1974 | Purtell | |
| 4,074,411 A * | 2/1978 | Willard | B25B 27/02 29/267 |
| 4,176,435 A * | 12/1979 | Castoe | B25B 27/26 29/220 |
| 4,223,431 A | 9/1980 | Skeels | |
| 4,262,403 A * | 4/1981 | Wilhelm | B25B 27/26 29/220 |
| 4,266,330 A | 5/1981 | Conte | |
| 4,563,803 A * | 1/1986 | Dimoff | B25B 27/24 29/213.1 |
| 5,241,734 A * | 9/1993 | Brackett | B25B 27/24 29/219 |
| 5,251,875 A | 10/1993 | Crayehee et al. | |
| 5,339,515 A * | 8/1994 | Brackett | B25B 27/24 29/216 |
| 5,349,732 A * | 9/1994 | Spence | B25B 7/02 29/221 |
| 6,374,473 B1 * | 4/2002 | Edwards | B25B 27/26 29/220 |
| 6,895,646 B1 * | 5/2005 | Houg | B25B 27/026 29/252 |
| 7,040,610 B2 * | 5/2006 | Hubbard | B25B 27/02 269/249 |
| 7,114,233 B1 | 10/2006 | Wyrick et al. | |
| 7,237,480 B2 * | 7/2007 | Ruddock | B65F 1/1405 100/226 |
| 8,276,253 B2 | 10/2012 | Herbold et al. | |
| 8,746,052 B2 * | 6/2014 | Gentner | G01M 15/02 73/114.79 |
| 2005/0217511 A1 * | 10/2005 | Ruddock | B65F 1/1405 100/226 |
| 2005/0225019 A1 * | 10/2005 | Hubbard | B25B 27/02 269/267 |
| 2010/0307000 A1 * | 12/2010 | Herbold | F23R 3/60 29/888 |
| 2011/0247193 A1 * | 10/2011 | Herbold | F23R 3/002 29/464 |
| 2012/0325083 A1 * | 12/2012 | Ting | F16J 9/28 92/168 |
| 2014/0137406 A1 * | 5/2014 | Firzlaff | B25B 27/0035 29/888.061 |
| 2015/0183103 A1 * | 7/2015 | Wu | B25B 27/26 29/217 |

\* cited by examiner

TOOL AND METHOD FOR SEATING ENGINE PISTONS

FIELD OF THE INVENTION

The present invention relates generally to mechanical tools. More particularly, the present invention relates to a tool and method for seating engine pistons, for example, during maintenance of diesel locomotive engines.

BACKGROUND OF THE INVENTION

Diesel locomotives are the main workhorses in rail freight transport operations. These locomotives typically employ powerful diesel engines such as the well-known EMD line of engines, including EMD 567, EMD 645, and EMD 710 series. During freight operations, parts of a diesel locomotive engine, such as its power assembly, are subject to wear and tear which cause their performance to gradually deteriorate until a point where they no longer provide a satisfactory power output and/or efficiency. It is usually much less costly to rebuild a diesel engine than to purchase a brand new one. Thus, a main function of a railroad machine shop is to disassemble old diesel locomotive engines, to repair, remanufacture, or replace parts of the power assembly, to clean various components of the engines, and then to reassemble the engines into almost new, working conditions. Such an engine rebuilding process is repeated by maintenance engineers on a regular basis.

One important step of reassembling a diesel locomotive engine is to re-install new engine pistons into their respective cylinders. During this step, each piston has to be pushed down in a corresponding engine cylinder and properly seated in the piston carrier. Previously, maintenance engineers would typically re-seat engine pistons with simple specialized tools, such as a T-handle or a "piston and rod holding tool for EMD engines" (Model T51082, sold by Tesco at http://www.tescotools.com/emd-1/pistons-and-valves/t51082-piston-and-rod-holding-tool-for-emd-engines). These hand tools typically include a push rod which has a threaded tip at one end for attachment to the top of a piston and has a T-shaped or ring-shaped handle at the opposite end. An engineer has to hold onto the handle and apply an extraordinary amount of force along the push rod to thrust the attached piston down towards the piston carrier. According to one estimate, it takes about 190-200 pounds of force in order to overcome the friction between the piston ring and the cylinder liner during the piston re-seating process. Since the entire force needed to force the piston down the cylinder has to come from the engineer, he often has to assume a challenging or awkward body position and could suffer from muscle strain. With those simple hand tools, it is also quite difficult to control the alignment of a piston with its carrier.

Sometimes when a piston is extremely tight-fit with respect to a cylinder, engineers had to use a hammer to knock on the handle end of the hand tool. However, the hammering action could cause tremendous impulsive impacts on the piston which may damage the crown of the piston: for example, where the T-handle screws in could crack). It is much more desirable to use a smooth downward movement to re-seat a piston because it also aids in a proper alignment with the piston carrier.

In view of the foregoing, it may be understood that there are significant problems and shortcomings associated with current tools and methods for diesel engine maintenance.

SUMMARY OF THE INVENTION

To overcome the above-mentioned and other problems and shortcomings in the prior art, designs of a tool for seating engine pistons are disclosed, as are methods of using such a tool. In one particular exemplary embodiment, a tool for seating a piston of an EMD engine may comprise a mount element, coupled to a support element, which has at least one sleeve shaped to slide onto one or more studs on an EMD engine block. The tool may also comprise a locator element, coupled to the mount element, having a guiding ring positioned relative to the at least one sleeve. The tool may further comprise a cantilever beam pivotally coupled to the support element. The tool may additionally comprise a push rod inserted through the guiding ring and coupled to the cantilever beam, such that a pivoting motion of the cantilever beam causes a linear movement of the push rod through the guiding ring. There may be an attachment element located on one end of the push rod, the attachment element being adapted to attach to a piston of the EMD engine.

In another particular exemplary embodiment, a method for seating a piston of an EMD engine may be implemented with a specialized tool having a mount element with at least one sleeve and a guiding ring, a cantilever beam pivotally coupled to the support element, and a push rod inserted through the guiding ring and coupled to the cantilever beam. The method may comprise mounting the specialized tool to the EMD engine by sliding the at least one sleeve over one or more studs on the EMD engine block, such that the specialized tool is substantially secured in place with the guiding ring substantially centered over a cylinder of the EMD engine. The method may also comprise attaching a free end of the push rod to a piston of the EMD engine. The method may further comprise applying force to one end of the cantilever beam to cause a linear movement of the push rod directed by the guiding ring to thereby pushing the piston through the cylinder.

In yet another particular exemplary embodiment, a tool for seating a piston of a diesel engine may comprise a mount element, coupled to a support element, for securing the tool on or near a diesel engine block. The tool may also comprise a locator element, coupled to the mount element, having a guiding ring positioned relative to the support element. The tool may further comprise a cantilever beam pivotally coupled to the support element. The tool may additionally comprise a push rod inserted through the guiding ring and coupled to the cantilever beam, such that a pivoting motion of the cantilever beam causes a linear movement of the push rod through the guiding ring. There may be an attachment element located on one end of the push rod, the attachment element being adapted to attach to a piston of the diesel engine.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the present invention provide for a tool and method for safer and more efficient maintenance of diesel engines. An exemplary tool utilizes a lever and fulcrum design to gain a mechanical advantage when applying a downward force onto a piston to seat it on carrier. This new tool may be adapted for the maintenance of EMD locomotive engines, facilitates a smooth movement of, and an evenly applied force on, the piston, and achieves a significant reduction of manual force required of machine shop engineers.

Figure 1:
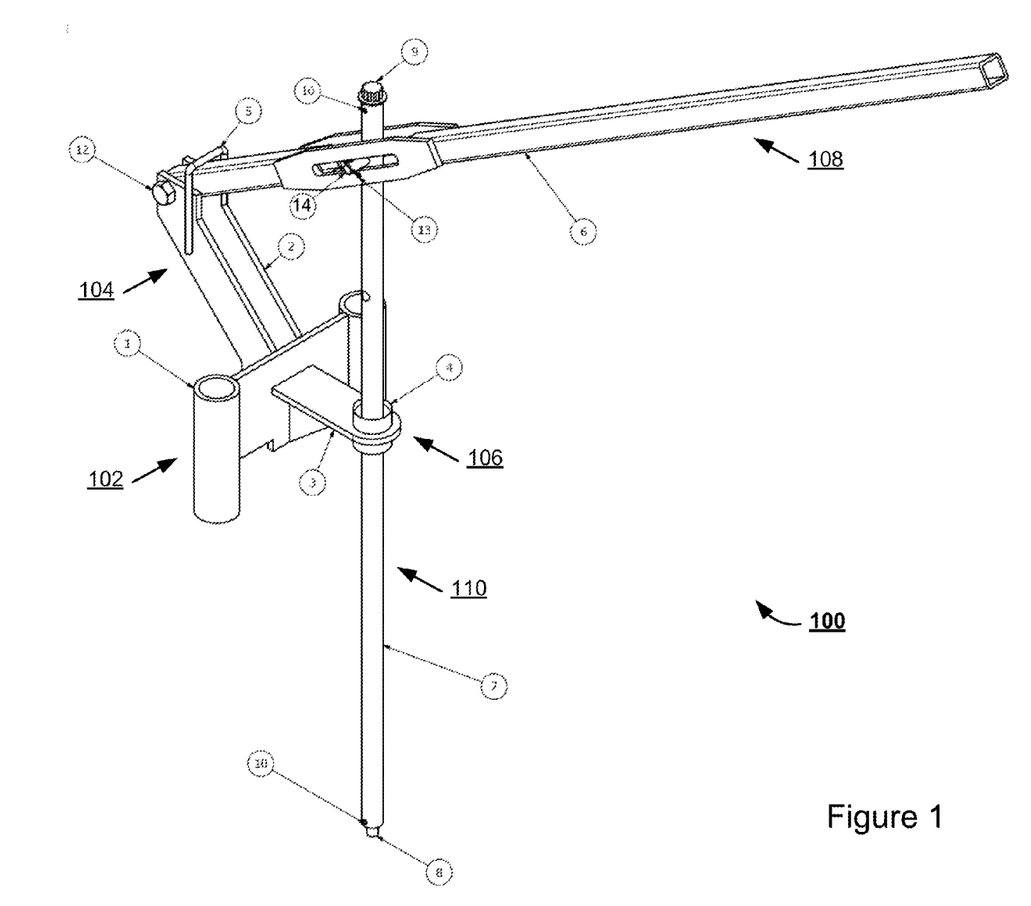
FIG. 1 shows an assembled view of an exemplary tool for seating engine pistons in accordance with an embodiment of the present invention.

Referring to FIG. 1, there is shown an assembled view of an exemplary tool for seating engine pistons in accordance with an embodiment of the present invention. On a high level, the exemplary tool 100 may comprise a mount element 102, a support element 104, a locator element 106, a cantilever beam 108, and a push rod 110. Each of these elements will be described in more detail with reference to their respective drawings.

A main function of the mount element 102 is to help securely anchor the tool 100 during operation. Towards that end, the mount element 102 may comprise one or more mechanisms adapted to engage with an engine part. In this particular example, there may be two cylindrical sleeves 1 configured to slide onto two studs on an EMD engine block. Apart from the sleeve configuration, other methods (and corresponding components) for attaching or fastening the tool 100 to an engine block or other anchoring location(s) may also be used.

The support element 104, coupled to the mount element 102 via a neck member 2, further provides a pivot for the cantilever beam 108. In this example, the pivot may be provided by a hex bolt 12. The support element 104 may also comprise an optional stopper 5 to limit the range of movement of the cantilever beam 108.

The locator element 106, also coupled to the mount element 102, positions a guiding ring 4 in a desired relative location with respect to the mount element 102 and/or the pivot point (e.g., bolt 12) of the cantilever 108. For example, the relative location may be configured with a fixed or adjustable member 3. According to this particular embodiment, with the sleeves 1 designed to engage with two standard studs on an EMD engine block, the locator element 106 may cause the guiding ring to be substantially centered over a corresponding cylinder of the EMD engine.

The cantilever beam 108, pivotally coupled to the support element 104, is also coupled to the push rod 110. The push rod 110 is in turn inserted through the guiding ring 4, such that a pivoting motion of the cantilever beam 108 causes a linear movement of the push rod 110 through the guiding ring 4.

The push rod 110 may comprise a solid or hollow member 7 whose outer diameter is slightly smaller than the inner diameter of the guiding ring 4. (Although in this example both the guiding ring 4 and the cross-section of the push rod member 7 are shown to be circular, they could be in other shapes and do not even have to be in matching shapes.) At the lower end, the push rod 110 may include an attachment element, such as a threaded tip 8, which is adapted to attach to the top of an engine piston. At the top end, the push rod 110 may include one or more cotter pins 13 that can slide in slotted member(s) 14 and thereby couple the push rod 110 with the cantilever beam 108. The cantilever beam 108 includes a handle bar 6 that extends substantially further away from the pivot bolt 12 than the slotted member(s) 14. At the top end, the push rod 110 may also include an application bolt 9 at the tip. The application bolt may be used to apply and remove the push rod 110 from an engine piston. According to one embodiment, both ends of the push rod 110 may be drilled and tapped. One end may be fitted with a ⅝" 11 TPI (threads per inch) twelve point hex head (the application bolt 9). The other end may be fitted with a ⅜" 16 TPI to screw into the piston. Roll pins 10 (see FIGS. 1, 7A-7C) may be added in order to keep the bolt and screw from falling apart from the push rod during removal.

According to this embodiment of the present invention, most or all of the components of the tool 100 may be manufactured from metal and/or metal alloy materials such as zinc plated mild steel. However, it may be appreciated by those skilled in the art that other non-metal (e.g., synthetic) materials may also be used as long as they have the requisite strength and integrity suited for the functions and purposes of the respective parts as described herein.

According to some embodiments, some or all of the components of the tool 100 may be linked or joined in a manner that allows quick manual assembly and dissembling with little to no use of other tools. For example, the bolt 12 may be of a type that can be tightened and loosened by hand. For another example, the support element 104 need not be permanently attached to the mount element 102 but can be inserted into one another to be latched together or linked with hand screws.

Figure 2A:
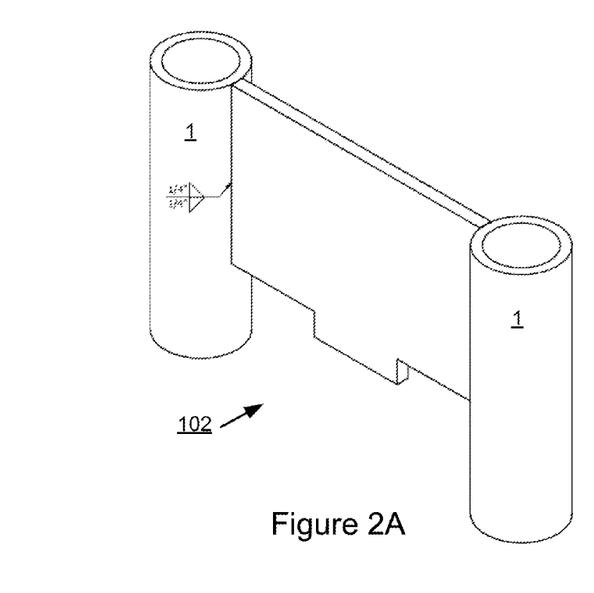
FIGS. 2A-2C show various views of a mount element of the exemplary tool for seating engine pistons in accordance with an embodiment of the present invention.
Figure 2B:
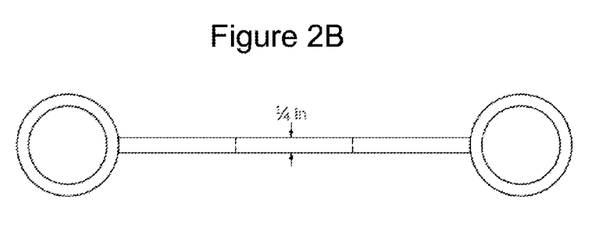
Figure 2C:
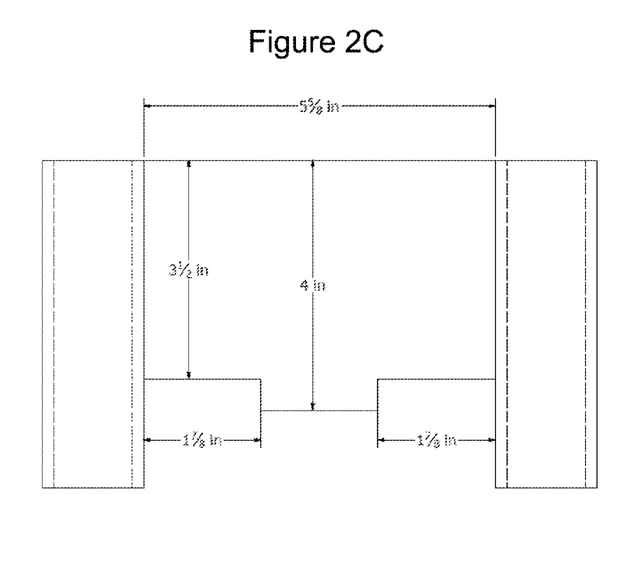

FIGS. 2A-2C show various views as well as exemplary dimensions of the mount element 102 of the exemplary tool 100 for seating engine pistons in accordance with an embodiment of the present invention. According to this particular example, the two cylindrical sleeves 1 are adapted to slide onto two of the studs of an EMD engine to which the rocker arm shaft is mounted.

Figure 3A:
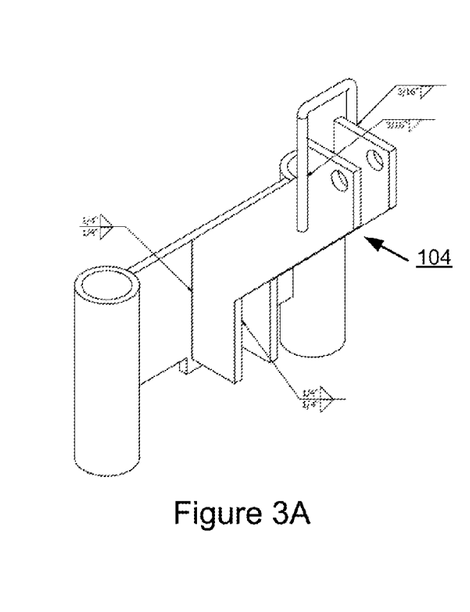
FIGS. 3A-3C show various views of a support element of the exemplary tool for seating engine pistons in accordance with an embodiment of the present invention.
Figure 3B:
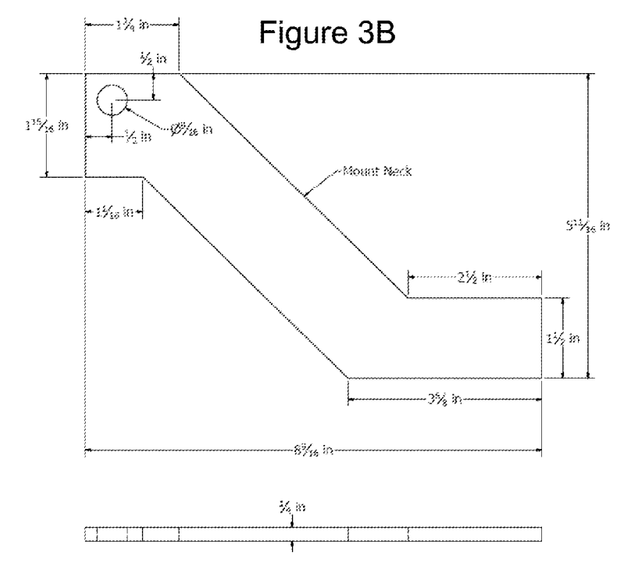
Figure 3C:
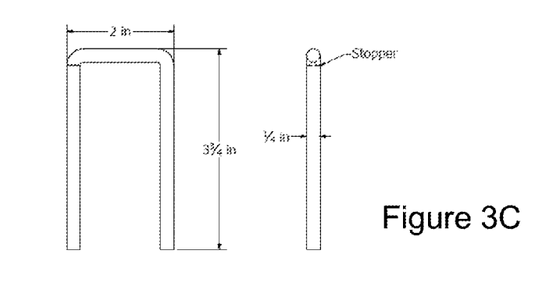
Figure 4A:
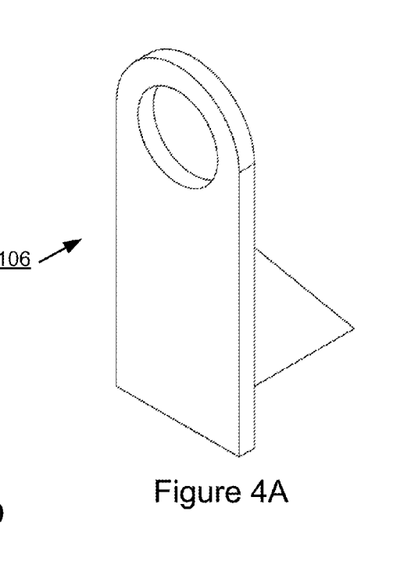
FIGS. 4A-4D show various views of a locator element of the exemplary tool for seating engine pistons in accordance with an embodiment of the present invention.
Figure 4B:
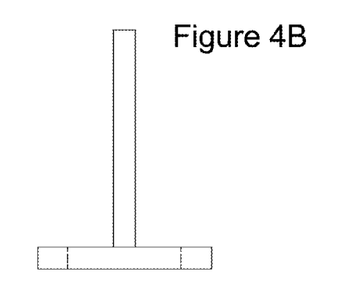
Figure 4C:
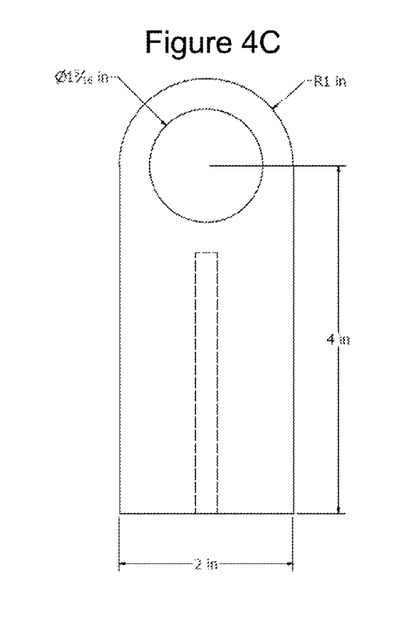
Figure 4D:
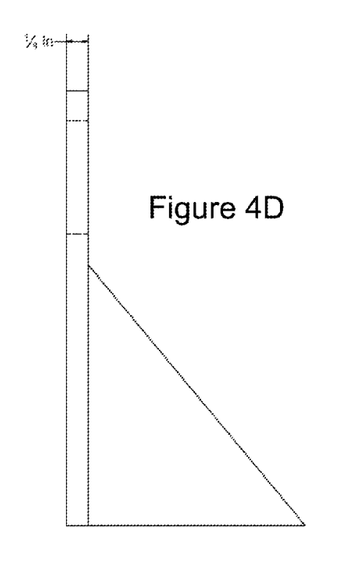

FIGS. 3A-3C show various views as well as exemplary dimensions of the support element 104 of the exemplary tool 100 for seating engine pistons in accordance with an embodiment of the present invention.

FIGS. 4A-4D show various views as well as exemplary dimensions of the locator element 106 of the exemplary tool 100 for seating engine pistons in accordance with an embodiment of the present invention.

Figure 5A:
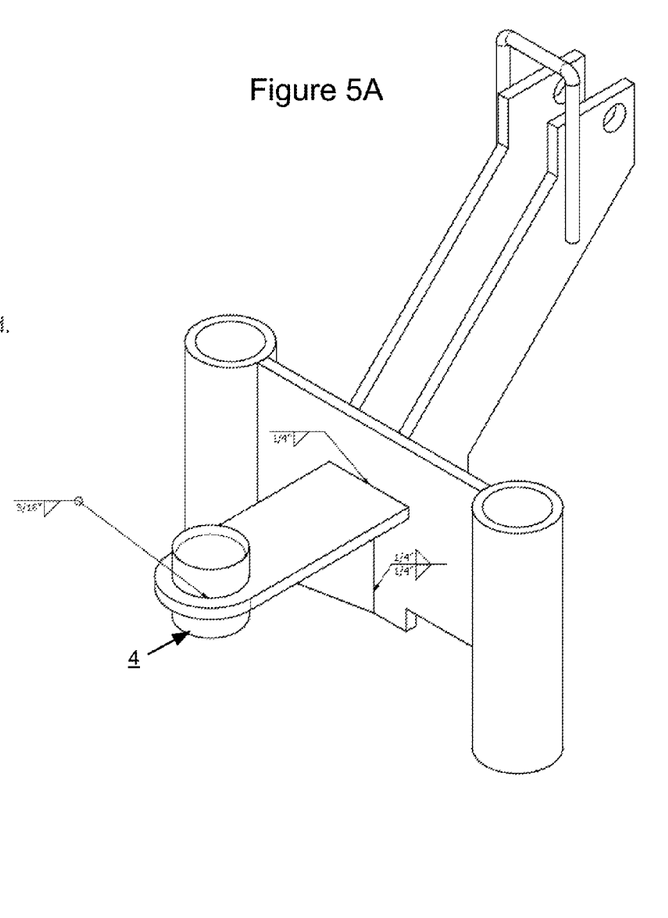
FIGS. 5A-5C show various views of a guiding ring of the exemplary tool for seating engine pistons in accordance with an embodiment of the present invention.
Figure 5B:
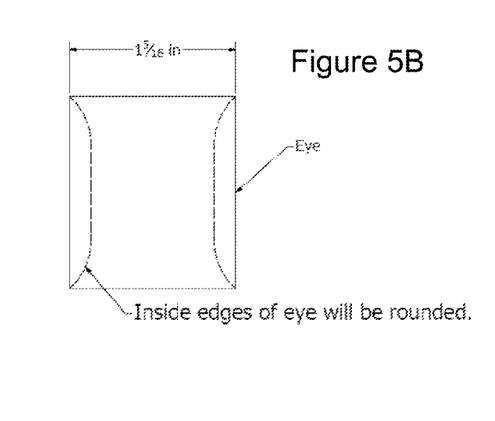
Figure 5C:
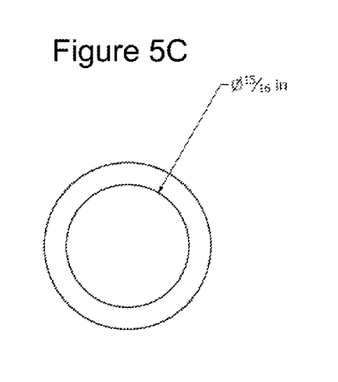

FIGS. 5A-5C show various views as well as exemplary dimensions of the guiding ring 4 of the exemplary tool 100 for seating engine pistons in accordance with an embodiment of the present invention.

Figure 6A:
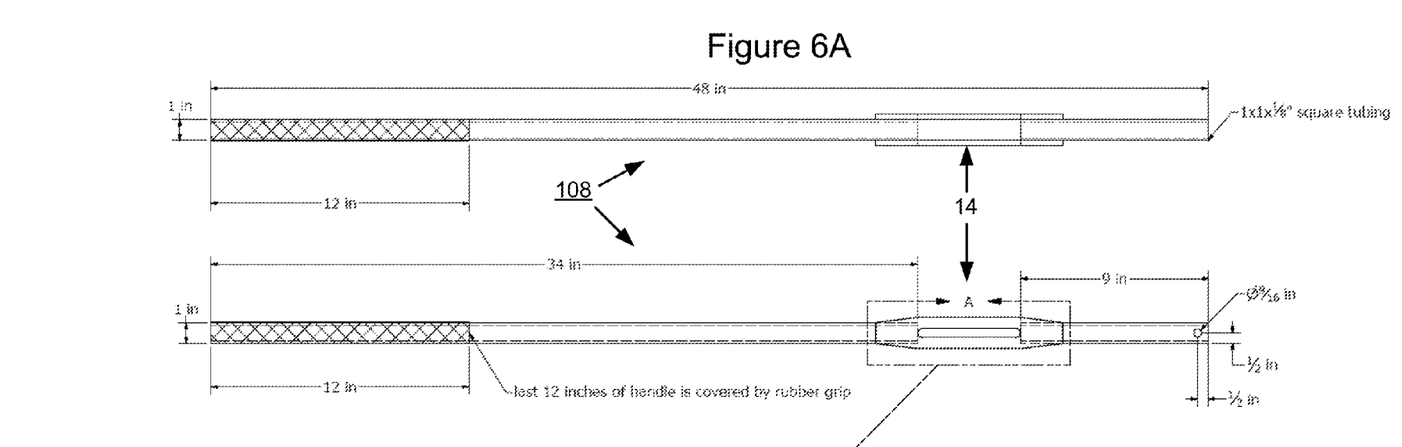
FIGS. 6A-6B show various views of a cantilever beam of the exemplary tool for seating engine pistons in accordance with an embodiment of the present invention.
Figure 6B:
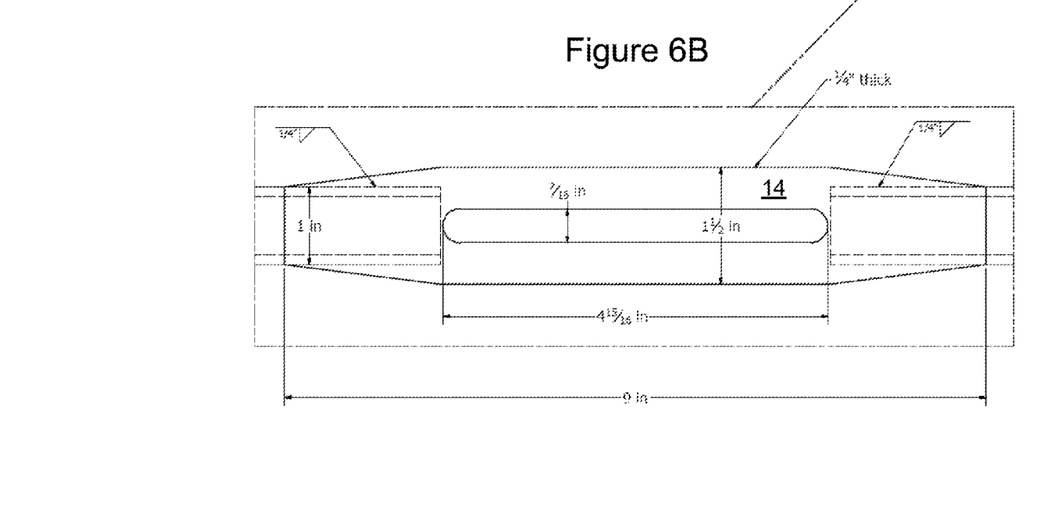

FIGS. 6A-6B show various views as well as exemplary dimensions of the cantilever beam 108 of the exemplary tool 100 for seating engine pistons in accordance with an embodiment of the present invention. Despite the specific example shown in FIG. 6A, the cantilever beam 108 need not be in the three-piece design where two square tubes are connected with the slot members 14. For example, the cantilever beam 108 may be constructed out of a single piece of metal tube while still incorporating the slot(s) for coupling with the cotter pin(s) on the push rod. In either case, the tubes may be square or round or have a cross-section of other shapes. According to another embodiment of the present invention, at least a part of the cantilever beam 108 (e.g., the handle bar portion) may have an adjustable length or be removable, foldable or collapsible.

Figure 7A:
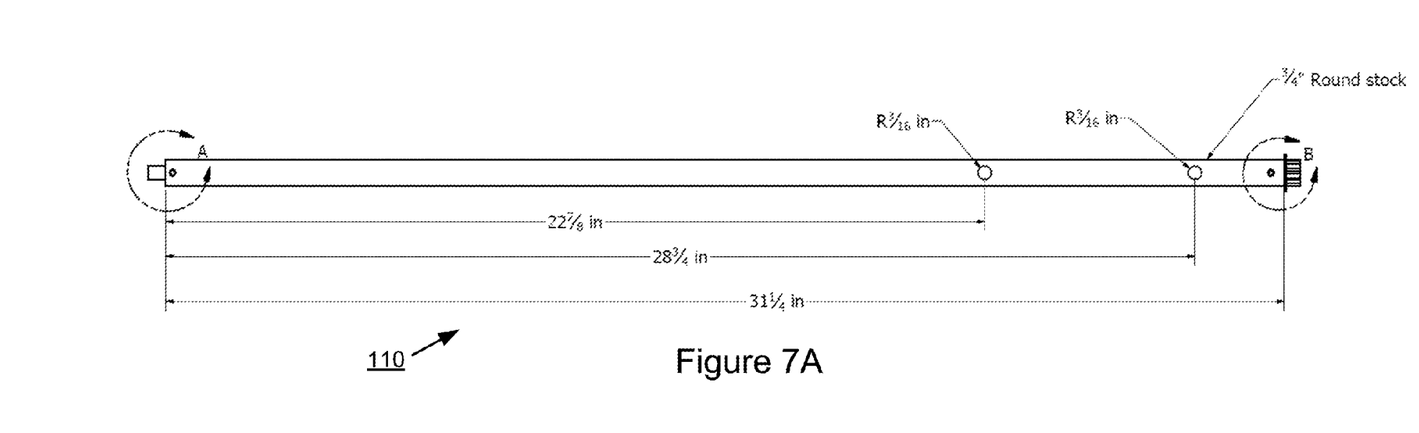
FIGS. 7A-7C show various views of a push rod of the exemplary tool for seating engine pistons in accordance with an embodiment of the present invention.
Figure 7B:
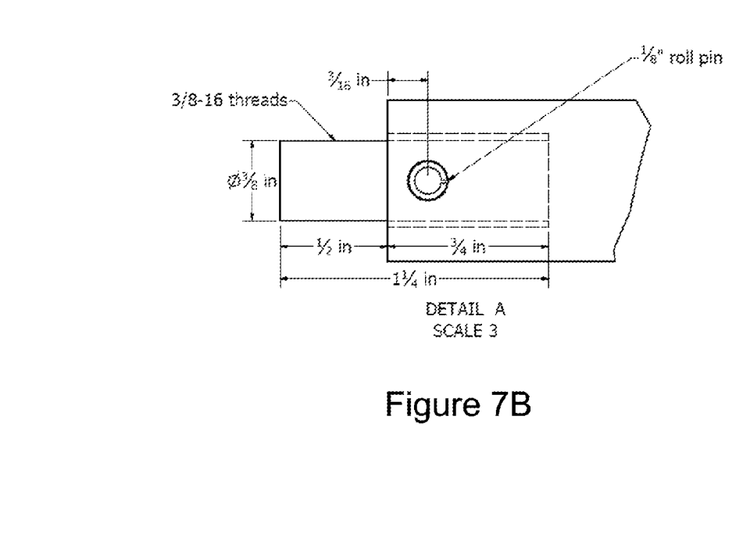
Figure 7C:
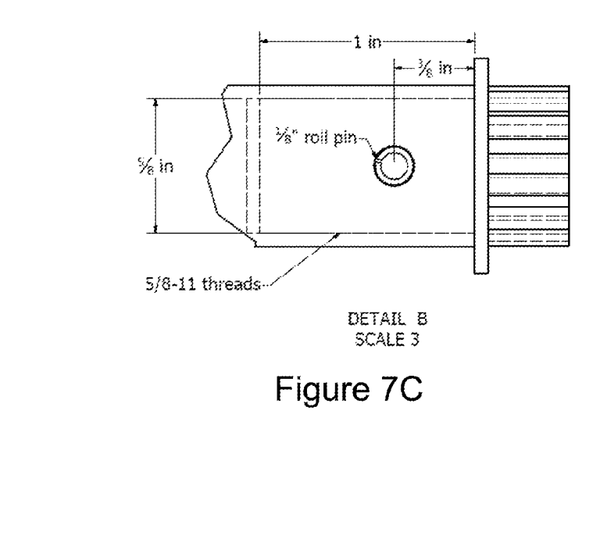

FIGS. 7A-7C show various views as well as exemplary dimensions of the push rod 110 of the exemplary tool 100 for seating engine pistons in accordance with an embodiment of the present invention. It should be noted that, other than the threaded tip shown in FIG. 7B, the attachment element at the lower end of the push rod 110 could alternatively use another engagement mechanism for attaching to the piston. For example, the top of the piston could include a snap-in socket whereas the attachment element on the push rod could be a matching protruded member. In another alternative embodiment, the lower end of the push rod 110 need not even attach to the piston but only need to push against the top of the piston.

Figure 8:
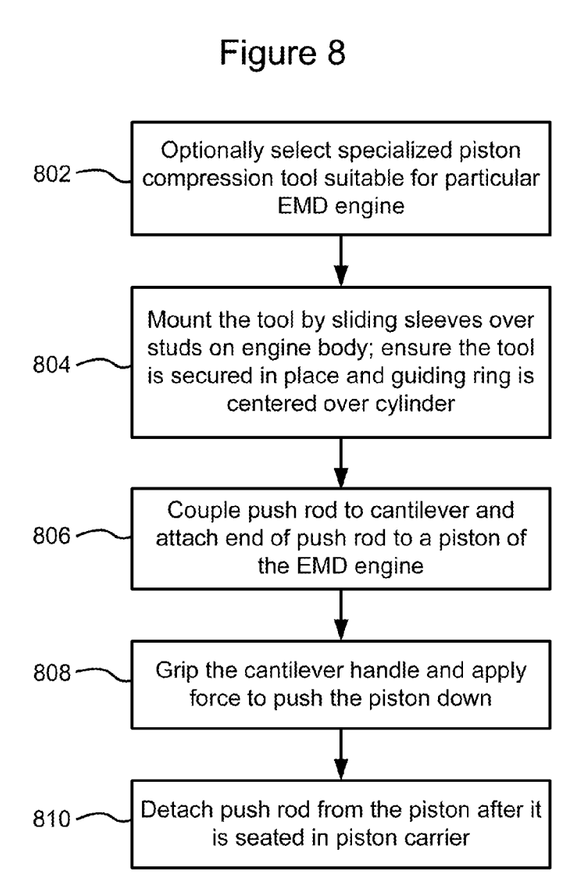
FIG. 8 shows a flow chart illustrating an exemplary method for seating an engine piston in accordance with an embodiment of the present invention.

FIG. 8 shows a flow chart illustrating an exemplary method for seating an engine piston in accordance with an embodiment of the present invention.

In step 802, an engineer may select a specialized piston compression tool suitable for a particular EMD engine. The tool may be the one described above in connection with FIGS. 1-7. According to some embodiments of the present invention, there may be multiple tools in the workshop which follow the general operating principles described herein but are configured for different engines or pistons. For example, for different EMD engine models, it might be necessary to have different configurations of the mount element and/or locator element (including guiding ring) to accommodate the differences in engine block dimensions. Alternatively, the tool may be adjustable in certain dimensions or have some of these elements as detachable parts so that a proper configuration for the engine/piston at hand could be easily achieved. According to one particular embodiment of the present invention, a tool may be provided which fits all the typically EMD engine models without the need for adjustment.

In step 804, the tool may be mounted to the engine body or another fixed location off the engine. It may be desirable to ensure that the tool has been secured in place and the guiding ring (and therefore the push rod) is centered over the cylinder into which a piston is to be installed.

In step 806, the push rod may be coupled to the cantilever beam (e.g., with a #13 ⅜" retaining clip), and one end of the push rod may be attached the piston, for example, by screwing a threaded tip of the push rod into the crown of the piston. Those skilled in the art would appreciate that other methods of attaching the push rod to the cantilever and the piston respectively could also be used without departing from the spirit of the present invention.

Then, in step 808, the engineer may grip the cantilever handle and apply a downward force to slowly but steadily push the piston onto its carrier within the cylinder. Because of the long arm provided on the cantilever beam, there may be a 50-70% reduction of force required (from the originally required 190-200 pounds). As a result, any able-bodied engineer with reasonable upper-body strength could effortlessly lower the piston into place while ensuring it is properly aligned.

Finally, in step 810, the push rod may be detached from the piston (e.g., by unscrewing the threaded tip of the push rod) after the re-seating process is completed.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A tool, comprising:
   a mount element, coupled to a support element, having at least one sleeve shaped to slide onto one or more studs on an engine block, wherein the at least one sleeve comprises two sleeves that are shaped to slide onto two studs on the engine block and thereby secure the tool in place;
   a locator element, coupled to the mount element, having a guiding ring positioned relative to the at least one sleeve;
   a cantilever beam pivotally coupled to the support element;
   a push rod inserted through the guiding ring and coupled to the cantilever beam, such that a pivoting motion of the cantilever beam causes a linear movement of the push rod through the guiding ring; and
   an attachment element located on one end of the push rod, the attachment element being adapted to attach to a piston of the engine,
   wherein the guiding ring is located in a predetermined position relative to the two sleeves such that, when the two sleeves slide onto the two studs on the engine block, the guiding ring is substantially centered over a cylinder of the engine.

2. The tool according to claim 1, wherein the push rod comprises one or more cotter pins for coupling with the cantilever beam, the one or more cotter pins being guided in one or more respective slots in the cantilever beam to transfer force from the cantilever beam to the push rod without causing any substantial lateral movement of the push rod with respect to the guiding ring.

3. The tool according to claim 1, wherein the support element further comprises a stopper element that limits a range of movement of the cantilever beam.

4. The tool according to claim 1, wherein the support element provides a pivot for the cantilever beam.

5. The tool according to claim 4, wherein the cantilever beam has a handle bar that extends substantially further away from the pivot than a coupling point between the push rod and the cantilever beam.

6. The tool according to claim 1, wherein the cantilever beam has an adjustable length.

7. The tool according to claim 1, wherein the cantilever beam comprises a handle bar that is removable, foldable or collapsible.

8. The tool according to claim 1, wherein the locator element has an adjustable configuration or can be detached and replaced with another locator element of a desired configuration.

9. A method for seating a piston of an engine with a specialized tool having a mount element with at least one sleeve and a guiding ring, a cantilever beam pivotally coupled to the support element, and a push rod inserted through the guiding ring and coupled to the cantilever beam, wherein the at least one sleeve comprises two sleeves that are shaped to slide onto two studs on an engine block and thereby secure the tool in place, the method comprising:

mounting the specialized tool to the engine by sliding the two sleeves over the two studs on the engine block, such that the specialized tool is substantially secured in place with the guiding ring substantially centered over a cylinder of the engine due to a predetermined position of the guiding ring relative to the two sleeves;

attaching a free end of the push rod to a piston of the engine;

applying force to one end of the cantilever beam to cause a linear movement of the push rod directed by the guiding ring to thereby pushing the piston through the cylinder.

10. A tool, comprising:

a mount element, coupled to a support element, for securing the tool on or near a diesel engine block, the mount element comprising two sleeves that are shaped to slide onto two studs on the diesel engine block and thereby secure the tool in place;

a locator element, coupled to the mount element, having a guiding ring positioned relative to the support element;

a cantilever beam pivotally coupled to the support element;

a push rod inserted through the guiding ring and coupled to the cantilever beam, such that a pivoting motion of the cantilever beam causes a linear movement of the push rod through the guiding ring; and an attachment element located on one end of the push rod, the attachment element being adapted to attach to a piston of the diesel engine, wherein the guiding ring is located in a predetermined position relative to the two sleeves such that, when the two sleeves slide onto the two studs on the diesel engine block, the guiding ring is substantially centered over a cylinder of the diesel engine.

\* \* \* \* \*